Sept. 4, 1945.  W. MINNER  2,383,940

TRACK FOR TOY VEHICLES

Filed Sept. 23, 1940

Inventor:
Walter Minner,
by Frank S. Appleman,
attorney.

Patented Sept. 4, 1945

2,383,940

UNITED STATES PATENT OFFICE 2,383,940

TRACK FOR TOY VEHICLES

Walter Minner, Erfurt, Germany; vested in the Alien Property Custodian

Application September 23, 1940, Serial No. 357,839½. In Germany September 13, 1939

2 Claims. (Cl. 46—213)

This invention relates to toy vehicles and tracks therefor.

One important object of the invention is to provide a novel arrangement of toy vehicle whereby one vehicle overtaking another will be deflected to pass the overtaken vehicle.

A second important object of the invention is to provide a novel arrangement of toy vehicles and a track whereby the vehicles will always run on the outer edge of the track in passing curves of the track and the vehicles will be prevented from passing at such curves.

With the above and other objects in view, the invention consists in general of certain novel details of construction and combinations of parts hereinafter fully described, illustrated in the accompanying drawing and particularly claimed.

Figure 1:
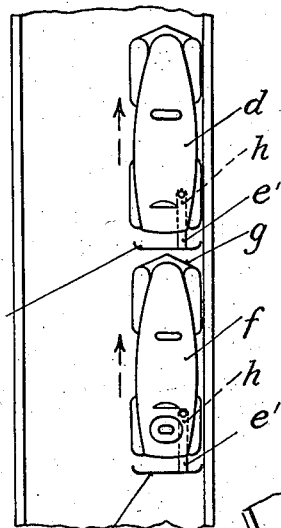
Figure 2:
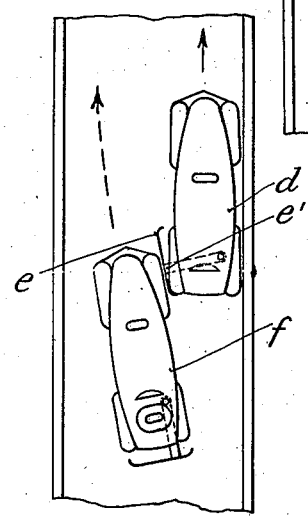
Figure 3:
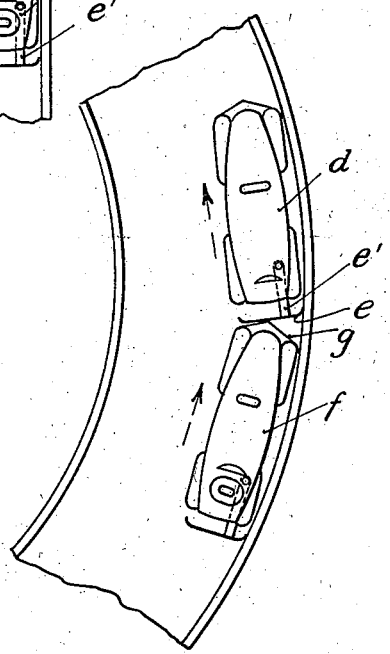
Figure 4:
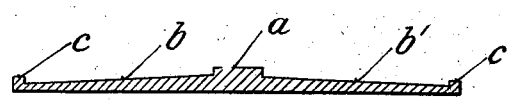

In the accompanying drawing, like characters of reference indicate like parts in the several views and in this drawing I have shown an example of construction of my novel track and toy vehicles, Fig. 1 being a diagrammatical top-view of a straight part of a track with two vehicles, one travelling in the rear of the other, Fig. 2 a top-view similar to Fig. 1 showing the same track and the two vehicles at a time when one passes the other, Fig. 3 a top-view of a curved part of a track and two vehicles with the rear vehicle engaging the front vehicle, and Fig. 4 a cross-section through a double track.

Referring more particularly to the drawing, the double track $a$ is of such conformation that each individual track $b$ and $b'$ is inclined towards the outside in such a manner that the two vehicles will always tend to travel at the right-hand side of the track as seen in the direction of travel. The inclination of said individual tracks is so slight that, although always urging the vehicles towards the right-hand side, there will be no obstruction to the free running of the vehicles in their direction of travel. At the rear part of each vehicle $d$ and $f$ there is provided a deflecting organ.

Each of these deflecting organs comprises a bumper $e$ extending transversely across the vehicle and spaced rearwardly of the body of said vehicle. The length of the bumper is substantially equal to the width of the vehicle and the ends of said bumper are curved forwardly. Fixed to the bumper adjacent its right hand end is an arm $e'$ which extends forwardly beneath the body of the vehicle and has its forward end pivoted to the vehicle at $h$, this pivot point being located to the right of the longitudinal center line of the vehicle. Fixed to the front of each vehicle is a bumper $g$ which is preferably V-shaped in plan so that the center of this bumper projects well forwardly of its ends.

In operation, when the vehicles are running, they will travel along the right side of the track. When the vehicle $f$ overtakes the vehicle $d$ the forwardly projecting center of the bumper $g$ will engage the center of the bumper $e$ as the latter normally lies squarely across the rear end of the vehicle $d$. If the vehicles are on a straight part of the track at this time the direction of the line of force exerted by the bumper $g$ will lie to the left of the pivot $h$ and the bumper $e$ will swing to the left and thus deflect the forward end of the vehicle $f$ to the left, as in Fig. 2. The vehicle $f$ may thus pass the vehicle $d$. If, however, the vehicle $f$ engages the vehicle $d$ on a curved portion of the track, as in Fig. 3, the direction of the line of force exerted by the projecting portion of bumper $g$ will lie to the right of the pivot $h$ so that the tendency of the bumper $e$ of vehicle $d$ will be to swing to the right and thus hold the vehicle $f$ against the outer rail $c$ or $c'$. Thus the vehicle $f$ will not pass the vehicle $d$ on a curve unless the radius be so long that the direction of the line of force exerted by the bumper $g$ lies to the right of the pivot $h$ of the vehicle $d$.

In case of a track having a long curve there may be provided at the entrance end of the curve and along the entire curve a rib or rail at the central part of the track, so that even in case the organ $e$, $e'$ should enter into deflected position the said rail will prevent any overtaking in the curve.

Obviously, the swinging bumper may be mounted at the front of the vehicle and the fixed bumper at the rear, the swinging bumper in such case being pivoted to the left of the vehicle center line.

In like manner an opposite arrangement is possible in which case the abutment member or push-rod may be fixed at the rear end of the vehicle travelling at smaller speed and the swingable deflecting organ at the front end of the vehicle travelling at greater speed.

Finally, a locking pin may be connected to the movable deflecting organ, said locking pin coming in engagement with a stop-member fixed on the track, so that when two vehicles traveling at the same speed are used on the track the first vehicle will be arrested at a certain place of the track, while the second vehicle following the first will disengage said locking pin from said stop-member, when the second vehicle overtakes the first and abuts against said deflecting organ, with the result that this vehicle will now follow the overtaking vehicle. Now the operation of the two vehicles is changed. While at the place of locking the first vehicle is now again arrested, the second vehicle will again overtake the first and again release the arrested vehicle and so forth. Thus it will be seen that my novel track and vehicle permit of a great variety of possibilities of play which will imitate most naturally the actual alternate overtaking of automobiles on a racing track.

I claim:

1. In a toy vehicle, a body, a swinging bumper extending across one end of the vehicle, an arm fixed to the bumper adjacent one end and extending from the bumper longitudinally beneath the body, a pivot connecting the end of the arm to the vehicle, and a second bumper fixed to the remaining end of the vehicle and having its central portion projecting to engage the swinging bumper of a second and similar vehicle.

2. In a toy vehicle, a body, a swinging bumper extending across one end of the vehicle, an arm fixed to the bumper adjacent one end and extending from the bumper longitudinally beneath the body, a pivot connecting the end of the arm to the vehicle, and a second bumper fixed to the remaining end of the vehicle and having its central portion projecting to engage the swinging bumper of a second and similar vehicle, in combination with a track having a curved portion provided at its outer edge with a guide rail for the vehicle, the radius of the curve being such as to cause the direction of the line of force of the fixed bumper of one vehicle engaging the swinging bumper of another vehicle to urge the swinging bumper towards the said rail.

WALTER MINNER.